(12) United States Patent
Nisani et al.

(10) Patent No.: US 7,581,001 B2
(45) Date of Patent: **\*Aug. 25, 2009**

(54) COMMUNICATION MANAGEMENT SYSTEM FOR COMPUTER NETWORK-BASED TELEPHONES

(75) Inventors: Mordechai Nisani, Guildford (GB); Danny Shporer, Rehovot (IL); Ilan Yosef, Pardesiia (IL); Eitan Bar, Even-Yehuda (IL)

(73) Assignee: STS Systems Ltd. (IL)

( * ) Notice: Subject to any disclaimer, the term of this patent is extended or adjusted under 35 U.S.C. 154(b) by 899 days.

This patent is subject to a terminal disclaimer.

(21) Appl. No.: 11/100,965

(22) Filed: Apr. 7, 2005

(65) Prior Publication Data

US 2005/0198252 A1  Sep. 8, 2005

Related U.S. Application Data

(63) Continuation of application No. 09/664,755, filed on Sep. 19, 2000, now abandoned, which is a continuation-in-part of application No. 09/140,453, filed on Aug. 26, 1998, now Pat. No. 6,122,665.

(51) Int. Cl.
*G06F 15/173* (2006.01)

(52) U.S. Cl. ............... 709/224; 709/206; 709/207; 709/227; 379/69

(58) Field of Classification Search ............... 709/224; 379/69

See application file for complete search history.

(56) References Cited

U.S. PATENT DOCUMENTS

| | | | |
|---|---|---|---|
| 5,101,402 A | 3/1992 | Chiu et al. | |
| 5,351,243 A | 9/1994 | Kalkunte et al. | |
| 5,430,709 A | 7/1995 | Galloway | |
| 5,515,376 A | 5/1996 | Murthy et al. | |
| 5,664,226 A | 9/1997 | Czako et al. | |
| 5,689,641 A | 11/1997 | Ludwig et al. | |
| 5,712,903 A | 1/1998 | Bartholomew et al. | |
| 5,717,879 A | 2/1998 | Moran et al. | |
| 5,742,833 A | 4/1998 | Dea et al. | |

(Continued)

FOREIGN PATENT DOCUMENTS

CA        02285870        6/2000

(Continued)

OTHER PUBLICATIONS

Radcom, "RADCOM Adds Uni 4.0 Signalling and MPEG-II Support to ATM Analysis Solutions," http://web.archive.org/web/19980527022611/www.radcom-inc.com/press13.htm, Tel Aviv, Israel, Nov., 1996.

(Continued)

*Primary Examiner*—Jeffrey Pwu
*Assistant Examiner*—Shripal K Khajuria
(74) *Attorney, Agent, or Firm*—Leason Ellis LLP

(57) ABSTRACT

A system and a method for monitoring a computer network to detect data packets including audio or video data, such packets being part of a communication session, for storing these packets and for reconstructing the communication session upon request. To enable the system to store packets independently of the protocol used to set up the communication session, for example in a Voice Over IP environment, the system includes a link to the gatekeeper of the computer network.

13 Claims, 9 Drawing Sheets

U.S. PATENT DOCUMENTS

| | | | |
|---|---|---|---|
| 5,787,253 | A | 7/1998 | McCreery et al. |
| 5,848,233 | A | 12/1998 | Radia et al. |
| 5,850,386 | A | 12/1998 | Anderson et al. |
| 5,850,388 | A | 12/1998 | Anderson et al. |
| 5,912,887 | A | 6/1999 | Sehgal |
| 5,930,752 | A | 7/1999 | Kawaguchi et al. |
| 5,964,839 | A | 10/1999 | Johnson et al. |
| 5,966,427 | A | 10/1999 | Shaffer et al. |
| 6,044,401 | A | 3/2000 | Harvey |
| 6,055,302 | A | 4/2000 | Schmersel et al. |
| 6,108,782 | A | 8/2000 | Fletcher et al. |
| 6,122,665 | A * | 9/2000 | Bar et al. ............... 709/224 |
| 6,292,827 | B1 * | 9/2001 | Raz ...................... 709/217 |
| 6,668,273 | B1 | 12/2003 | Rust |
| 6,826,174 | B1 * | 11/2004 | Erekson et al. ........ 370/352 |

FOREIGN PATENT DOCUMENTS

| | | |
|---|---|---|
| DE | 19833969 | 2/2000 |
| EP | 0716533 | 6/1996 |
| EP | 0 841 832 A2 | 5/1998 |
| EP | 0892530 | 1/1999 |
| EP | 0948163 | 10/1999 |
| EP | 1010314 | 6/2000 |
| EP | 1014633 | 6/2000 |
| EP | 1319299 | 12/2001 |
| EP | 0980608 | 10/2002 |
| EP | 1247386 | 10/2007 |
| JP | 05-145551 | 6/1993 |
| JP | 07-107157 | 4/1995 |
| JP | 08-307456 | 11/1996 |
| JP | 09-097220 | 4/1997 |
| JP | 09233113 | 9/1997 |
| JP | 10051460 | 2/1998 |
| JP | 10215331 | 8/1998 |
| JP | 2000174825 | 8/2000 |
| KR | 1020000027464 | 5/2000 |
| WO | WO 96/37979 | 11/1996 |
| WO | WO-97 41674 A | 11/1997 |
| WO | WO 98/51041 | 11/1998 |
| WO | WO 99/12329 | 3/1999 |
| WO | WO 99/14931 | 3/1999 |
| WO | WO 99/25102 | 5/1999 |
| WO | WO 99/26409 | 5/1999 |
| WO | WO 99/29095 | 6/1999 |
| WO | WO-99 44363 A | 9/1999 |
| WO | WO 00/22843 | 4/2000 |
| WO | WO-00 28425 A | 5/2000 |
| WO | WO-00 52916 A | 9/2000 |
| WO | WO 00/54468 | 9/2000 |

OTHER PUBLICATIONS

S. Waldbusser, Carneige Mellon University "RFC 1757-Remote Network Monitoring Management Information Base", http://www.faqs.org.rfcs/rfc1757.html (65 pages) Feb. 1995.
International Telecommunication Union, Series H: Audiovisual and Multimedia Systems, Infrastructure of audiovisual services—Transmission multiplexing and synchronization, "Call singalling protocols and media stream packetization for packet-based multimedia communication systems," ITU-T Recommendation H.225.0, Printed in Switzerland, Geneva, 1998.
Radcom, Prismlite: Portable WAN/LAN/ATM Protocol, http://web.archive.org/web/19980527020156/www.radcom-inc.com/pro-p2.htm, 3 pages.
Radcom Press Releases, "New VoIP Testing Applications from RADCOM," Tel Aviv, Feb.9, 1999, http://www.radcom.com/radcom/about/pr020999.htm, 2 pages.
Checkpoint Products Solutions, "Stateful Inspection in Action," http://web.archive.org/web/19980212235911/www.checkpoint.com/products/technogy/page2.html, 4 pages.
Radcom, Supported Protocols, "Protocols, protocols, protocols . . . ," http://web.archive.org/web/19980527014033/www.radcom-inc.com/protocol.htm, 10 pages.
Checkpoint, Products & Solutions, Supported Applications "Audio/Video Streaming" http://web.archive.org/web/19980212233542/www.checkpoint.com/products/technology/index. html. (6 pages).
Communication Solutions CTI News Vendor to Vendor Headlines, http://www.tmcnet.com/articles/ctmimag/0699/0699news.htm (15 pages), Jun. 1999.
Mel Beckman, NetMeter 1.0 "See and hear your network", http://web.archive.org/web/19990224183147/macworld.zdnet.com/pages/june.96/Reviews.2144.html (3 pages).
Ag Group, Inc. Skyline/Satellite, About Skyline/Satellite "A quick look at Skyline/Satellite", http://web.archive.org/web/19980206033053/www.aggroup.com/skyline/.
Etherpeek, the ag group, inc., "Ethernet network analysis software" user manual for windows Verison 2.0 user's guide (171 pages).
Google Groups:comp.security.firewalls "Netmeeting through a packet-filter", http://groups-beta.google.com/group/comp.security.firewalls/browse_thread/thread/c14c3ac7d190a58/a4010ede22ff83a0 (4 pages).
Network Computing, "Hear it for yourself: Audio samples from our H.323 tests", http://www.nwc.com/1001/1001ws2.html, (7 pages) Jan. 11, 1999.
1994 O'Reilly & Associates, Inc. "Microsoft RIFF" http://netghost.narod.ru/gff/graphics/summary/micriff.htm, (5 pages).
Suchitra Raman & Angela Schuett, Departmant of EECS, University of California, Berkeley"On-demand Remote Playback", 10 pages.
International Telecommunication Union, Series H: Audiovisual and multimedia Systems, Infrastructure of audiovisual services—Communication procedures, "Control protocol for multimedia communication," Recommendation H.245.
Radcom, Lattency & Loss Measurements, "Breakthrough Internetworking Application for Latency & Loss Measurements from RADCOM," http://web.archive.org/web/19980527022443/www.radcom-inc.com/press21.htm, Tel Aviv, Apr. 1997, 2 pages.
Radcom, "Prism200 Multiport WAN/LAN/ATM Analyzer", http://web.archive.org/web/19980527020144/www.radcom-inc.com/pro-p1.htm (3 pages).
Robert J. Kohlhepp, Network Computing, Interactive Buyer's Guide, Reviews, "AG Group's Skyline/Satellite Combination Offers Bird's-Eye View of Network Traffic", http://ibg.networkcomputing.com/612/612skyline.html (7 pages).
International Telecommunication Union, Telecommunication Standardization Sector of ITU, Series H: Audiovisual And Multimedia Systems, Infrastructure of audiovisual services-Systems and terminal equipment for audiovisual services. "Packet-based multimedia communications systems," H.323 (Feb. 1998), 116 pages.
Viewing RTPDump Files, http://bmrc.berkeley.edu/-davesimp/viewingNotes.html, David Simpson, Oct. 12, 1996, (1 page).
Google Groups: muc.lists.firewalls, "MS Netmeeting 2.0 and Raptor Eagle vers. 4.0", http://groups-beta.google.com/group/muc.lists.firewalls/browse_thread/thread/ec0255b64bf36ad4?tvc=2 (3 pages).
Network Computing, "Voice Over IP, The Way It Should Be", http://www.nwc.com/1001/1001ws12.html (5 pages) Jan. 11, 1999.
mash-developers@mash.cs.berkeley.edu, "Vic-video conference", http://web.archive.org/web/19980209092254/mash.cs.berkeley.edu/mash. Last updated Mon. Sep. 8, 1997.
Intel., Intel support applications & technical notes, "Intel Internet Video Phone Trial Applet 2.1, The Problems and Pitfalls of Getting H.323 Safely Through Firewalls", http://web/archive.org/web/19980425132417/http://support.intel.com/support/videophone/trial21/h323_wpr.htm#aI8 (32 pages).
Checkpoint, Products Solutions, Tech note, "Check Point Firewall-1: Extensible Stateful Inspection," http://web.archive.org/web/19980212235917/www.checkpoint.com/products/technology/page3.html, 3 pages.
Dameon D. Welch-Abernathy, Check point log Reporter, "Re:[fw1-wizards] tcpdump for Solaris 2.6" http://oldfaq.phoneboy.com/gurus/200007/msg00081.html (2 pages).
vat-LBNL Audio Conferencing Tool, http://web.archive.org/web/19980126183021/www-nrg.ee.lbl.gov/vat (5 pages).

Schulzrinne et al. "RFC 1889: RTP: A Transport Protocol for Real-Time Applications," Network Working Group Request for Comments, Jan. 1996 (complete document 1-75).

Madeline Bodin, "Keeping An eye On Your Agents," Call Center Magazine, Feb. 1993, 4 pages.

tcpdump Jacobson et al. "tcpdump" manual inCluded with tcpdump ogragramm pp. 1-26, Jun. 20, 1994, (available via ftp.ee.lbl.gov since 1989) http://www.tcpdump.org/ zu finden.

Nice Systems Ltd.: NiceCLS Call Logging System Release 4.1 User's Manual, Document No. 385A0052-06, Tel Aviv May 1998.

Nokia Networks Oy: Actionet System Critical Call Recording Interface Specification, Feb. 2000.

ECMA: Standard ECMA-217 Services for Computer Supported Telecommunications Applications (CSTA) Phase II, Dec. 1994.

snort (laut Wikipedia seit 1998. www.snort.org).

http://de.wikipedia.org/wiki/Sniffer.

http://www.lanpedia.de/LAN-WAN-Analysis/htm/ger/_0/LANAnalyzer.htm.

Definition of H.323, Wikipedia, http://de.wikipedia.org/wiki/H.323, Feb. 6, 2008.

Ando et al., Architecture of Internet Telephony Software, VocaLinkSoft, NTT R&D, vol. 46, (1997).

* cited by examiner

H.225 and H.245 packet

RTP packet

RTCP packet

COMMUNICATION MANAGEMENT SYSTEM FOR COMPUTER NETWORK-BASED TELEPHONES

This is a continuation of U.S. application Ser. No. 09/664,755, filed Sep. 19, 2000, now abandoned, which is a continuation-in-part of U.S. patent application Ser. No. 09/140,453, filed Aug. 26, 1998, now U.S. Pat. No. 6,122,665.

FIELD AND BACKGROUND

The present invention is of a method and a system for the management of communication sessions for computer network-based telephone communication, and in particular for the identification of packets containing audio and/or video data, for the storage of these packets, and for the reconstruction of selected communication sessions for audio and/or video display as needed.

The integration of the computer into office communication systems has enabled many functions previously performed by separate devices to be combined into a single management system operated through a computer. For example, computer-based voice logging systems enable a computer to receive voice communication through a hardware connection to the regular telephony network, to record either a conversation, in which at least two parties converse, or a message from at least one party to one or more parties, and to replay these recorded conversations or messages upon request. These voice logging systems can replace mechanical telephone answering machines.

The computer logging systems have many advantages over the mechanical answering machines. For example, the voice messages can be stored in a computer-based storage medium, such as a DAT cassette, which has a greater storage capacity than regular audio cassettes. Furthermore, the stored voice messages can be organized in a database, such that the messages can retrieved according to time, date, channel, dialed number or caller identification, for example. Such organization is not possible with a mechanical telephone answering machine. Thus, computer logging systems for voice messages have many advantages over mechanical answering machines.

Unfortunately, currently available computer logging systems have the disadvantage of being unable to record telephone communication sessions, whether conversations or messages, for voice communication being performed through a LAN (local area network) or a WAN (wide area network). Although these logging systems can play back voice messages to a remote user through a LAN, for example, they cannot record such a message if it is transmitted by a LAN-based telephone. Such LAN and WAN based telephone communication has become more popular recently, since it enables telephone communication to be performed between various parties at physically separated sites without paying for local regular telephony network services, thereby saving money.

Furthermore, LAN and WAN based telephone communication also facilitates the transmission of video as well as audio information. Video information certainly cannot be recorded by currently available computer logging systems. Thus, the inability of computer logging systems to record telephone communication sessions for telephone communication being performed through a LAN or a WAN, including both video and audio data, is a significant disadvantage of these systems.

There is therefore a need for, and it would be highly advantageous to have, a system and a method for recording telephone communication sessions performed over a computer network, such as a LAN or a WAN, which would record both audio and video information, organize such information, and then display such information upon request.

The switching industry is moving towards the IP world. This move is having a huge impact on the telecommunications industry. It is too early to understand the full impact of this move.

The IP multimedia initiative got its momentum when the International Telecommunications Union published the H.323 standard ensuring compatibility between switching products from different vendors. The H.323 standard provides a foundation for audio, video and data communication across IP-based networks including the Internet.

Most of the main switching vendors such as Lucent, Siemens, Nortel and Alcatel have decided to integrate IP into their current switching platforms. Very soon, these vendors will present the market with new switch platforms based on IP technology.

All current recording solutions are based on the fact that a PBX or a central office utilizes a central switching matrix, with all calls being routed via this central matrix. Integration with this matrix insures that all calls routed by the PBX or central office could be recorded by a digital recording system that has a connection to the switch matrix. This, however, is inconsistent with the IP environment, which is inherently decentralized.

There is therefore a need for, and it would be highly advantageous to have, a system and a method for recording telephone communication sessions performed over a computer network, such as a LAN or a WAN, that would be independent of a central switching matrix.

SUMMARY OF THE INVENTION

It is one object of the present invention to provide a system and a method for recording communication sessions performed over a computer network.

It is another object of the present invention to provide such a system and method for analyzing data transmitted over the computer network in order to detect audio and video data for recording.

It is still another object of the present invention to provide such a system and method for displaying recorded video and audio data upon request.

It is yet another object of the present invention to provide such a system and method for analyzing, recording and displaying communication sessions conducted with a LAN-based telephone system.

These and other objects of the present invention are explained in further detail with regard to the drawings, description and claims provided below.

The present invention provides a system and a method for analyzing data packets on a computer network, for selectively recording audio and video data packets, for organizing this stored information and for displaying the stored information upon request, such that communication sessions with computer network-based "telephone" systems can be logged.

According to the teachings of the present invention, there is provided a system for managing a communication session over a computer network, the system comprising: (a) a network connector for connecting to the computer network and for receiving data packets from the computer network; (b) a filtering unit for filtering the data packets and for accepting the data packets substantially only if the data packets contain data selected from the group consisting of audio data and video data, such that the data packets form at least a portion of the communication session and such that the data packets are selected data packets; (c) a management unit for receiving the selected data packets and for storing the selected data packets, such that the selected data packets are stored data packets; and (d) a storage medium for receiving and for storing the stored data packets from the management unit, such that the at least a portion of the communication session is stored.

Preferably, the system further comprises (e) a data restore unit for retrieving and displaying the at least a portion of the communication session, the data restore unit requesting the data packets from the storage medium through the management unit, and the data restore unit reconstructing the data packets for displaying the at least a portion of the communication session.

More preferably, the data restore unit further comprises a communication session display unit for displaying the at least a portion of the communication session. Most preferably, the communication session display unit is selected from the group consisting of a video unit and an audio unit.

According to preferred embodiments of the present invention, the system further comprises (f) a database connected to the filtering unit for storing filtering information, the filtering information including at least one IP address of a party whose communication sessions are monitored; wherein the filtering unit accepts the data packets according to the filtering information, such that the filtering unit substantially only accepts the data packets if the data packets fulfill the filtering information.

Preferably, the system further comprises (g) a user computer for receiving at least one command of a user and for displaying information to the user, such that the user determines the filtering information according to the at least one command of the user.

More preferably, the computer network is selected from the group consisting of a LAN (local area network) and a WAN (wide area network). Most preferably, the computer network is a LAN (local area network).

According to further preferred embodiments of the present invention, the LAN is divided into at least two segments, the system further comprising: (h) a local management unit for each segment, the local management unit including the filtering unit and the management unit; and (i) a central management unit for controlling the local management units, the central management unit controlling storage in the storage medium.

Preferably, the network connector is a network interface card.

According to another embodiment of the present invention, there is provided a method for storing at least a portion of a communication session performed on a computer network, the communication session being performed between a packet source and a packet destination, the steps of the method being performed by a data processor, the method comprising the steps of: (a) receiving a data packet from the packet source on the computer network; (b) analyzing the data packet to determine if the data packet is an IP packet; (c) if the data packet is the IP packet, filtering the IP packet to determine a type of the IP packet; and (d) storing the IP packet to form a stored data packet according to the type, such that the stored data packet forms at least a portion of the communication session. Preferably, the step of analyzing the data packet is performed by examining a header of the data packet.

According to a preferred embodiment of the present invention, the step of filtering the IP packet is performed by examining the header of the IP packet.

Preferably, the step of filtering the IP packet further comprises the steps of: (i) examining the header of the IP packet to determine an IP address of the packet source; (ii) determining if the IP address is a recorded IP address; (iii) passing the IP packet to form a passed IP packet substantially only if the IP address is the recorded IP address; and (iv) alternatively, dumping the IP packet.

More preferably, the step of determining if the IP address is the recorded IP address is performed by comparing the IP address to a list of IP addresses from packet sources, such that if the IP address is included in the list, the IP address is the recorded IP address.

Also preferably, the step of filtering the IP packet further comprises the steps of: (v) determining whether the passed IP packet is an H.225 packet, a H.245 packet, an RTP packet or an RTCP packet; (vi) if the type of the passed IP packet is the H.225 packet, determining whether the H.225 packet is a setup packet or a connect packet; (vii) if the H.225 packet is the setup packet, setting a status flag as "start session request"; (viii) alternatively, if the H.225 packet is the connect packet and the status flag is "start session request", storing at least one detail of the communication session; and (ix) setting the status flag as "wait for logic channel".

More preferably, the step of filtering the IP packet further comprises the steps of: (x) alternatively, if the type of the passed IP packet is the H.245 packet, determining whether the H.245 packet is an open logical channel request packet, an open logical channel acknowledgment packet or a terminal capability set packet; (xi) if the H.245 packet is the open logical channel request packet and the status flag is "wait for logic channel", setting the status flag as "wait for acknowledgment"; (xii) alternatively, if the H.245 packet is the open logical channel acknowledgment packet and the status flag is "wait for acknowledgment", performing the steps of: (A) setting the status flag as "wait for terminal capability"; and (B) saving a transport address of the destination of the communication session; and (xiii) also alternatively, if the H.245 packet is the terminal capability set packet, performing the steps of: (A) storing a capability of the packet destination from the terminal capability packet; and (B) setting the status flag as "in call process".

Most preferably, if the status flag is "in call process" and the type of the passed IP packet is the RTP packet, the RTP packet is stored. Also most preferably, if the status flag is "in call process" and the type of the passed IP packet is the RTCP packet, the RTCP packet is stored.

According to another preferred embodiment of the present invention, the method further comprises the steps of: (e) retrieving the stored data packet to form a retrieved data packet; and (f) reconstructing at least a portion of the communication session according to the retrieved data packet.

Preferably, the step of retrieving the data packet includes the steps of: (i) receiving a source IP address of the packet source, a start time of the communication session, and an end time of the communication session; and (ii) selecting at least one communication session according to the source IP address, the start time and the end time.

Also preferably, the step of reconstructing at least a portion of the communication session includes displaying audio data.

Alternatively and also preferably, the step of reconstructing at least a portion of the communication session includes displaying video data.

More preferably, the step of reconstructing at least a portion of the communication session further comprises the steps of: (i) retrieving substantially only RTP packets; (ii) examining a header of the RTP packets to determine a time stamp for each of the RTP packets; and (iii) displaying the RTP packets in an order according to the time stamp.

According to the teachings of the present invention, there is provided a system for managing a communication session over a computer network that includes a gatekeeper, the system comprising: (a) a network connector for connecting to the computer network and for receiving data packets from the computer network; (b) a filtering unit for filtering the data packets and for accepting the data packets substantially only if the data packets contain data selected from the group consisting of audio data and video data, such that the data packets form at least a portion of the communication session and such that the data packets are selected data packets; (c) a management unit for receiving the selected data packets and for storing the selected data packets, such that the selected data packets are stored data packets; (d) a storage medium for receiving and for storing the stored data packets from the management unit, such that the at least a portion of the communication session is stored; and (e) a link, between the gatekeeper and the management unit, for transferring information related to the data packets from the gatekeeper to the management unit.

Preferably, the system further comprises (f) a data restore unit for retrieving and displaying the at least a portion of the communication session, the data restore unit requesting the data packets from the storage medium through the management unit, and the data restore unit reconstructing the data packets for displaying the at least a portion of the communication session.

More preferably, the data restore unit further comprises a communication session display unit for displaying the at least a portion of the communication session. Most preferably, the communication session display unit is selected from the group consisting of a video unit and an audio unit.

According to preferred embodiments of the present invention, the system further comprises (g) a database connected to the filtering unit for storing filtering information, the filtering information including at least one IP address of a party whose communication sessions are monitored; wherein the filtering unit accepts the data packets according to the filtering information, such that the filtering unit substantially only accepts the data packets if the data packets fulfill the filtering information.

Preferably, the system further comprises (h) a user computer for receiving at least one command of a user and for displaying information to the user, such that the user determines the filtering information according to the at least one command of the user.

More preferably, the computer network is selected from the group consisting of a LAN (local area network) and a WAN (wide area network). Most preferably, the computer network is a LAN (local area network).

According to further preferred embodiments of the present invention, the LAN is divided into at least two segments, the system further comprising: (i) a local management unit for each segment, the local management unit including the filtering unit and the management unit; and (j) a central management unit for controlling the local management units, the central management unit controlling storage in the storage medium.

Preferably, the network connector is a network interface card.

According to another embodiment of the present invention, there is provided a method for conducting a communication session on a computer network between a packet source and a packet destination, comprising the steps of: (a) setting up the communication session according to a first protocol suite; and (b) storing at least a portion of the communication session according to a second protocol suite different from the first protocol suite, the storing being performed by a data processor. For example, the second protocol suite may be an IP protocol suite.

Preferably, the storing of the portion of the communication session is performed by steps including: (i) receiving a data packet from the packet source on the computer network; (ii) analyzing the data packet to determine if the data packet is in accordance with the second protocol suite; and (iii) storing the data packet to form a stored data packet, such that the stored data packet forms at least a portion of the communication session. Preferably, the step of analyzing the data packet is effected by examining a header of the data packet.

According to another preferred embodiment of the present invention, the step of storing the at least a portion of the communication session further comprises the step of: (iv) subsequent to the analyzing, if the data packet is in accordance with the second protocol suite, filtering the data packet to determine a type of the data packet. Preferably, the step of analyzing the data packet is performed by examining a header of the data packet, and the step of filtering the data packet is performed by examining the header of the data packet.

Preferably, the second protocol suite is an IP protocol suite, the data packet is an IP packet, and the step of filtering the IP packet further comprises the steps of: (i) examining the header of the IP packet to determine an IP address of the packet source; (ii) determining if the IP address is a recorded IP address; (iii) passing the IP packet to form a passed IP packet substantially only if the IP address is the recorded IP address; and (iv) alternatively, dumping the IP packet.

More preferably, the step of determining if the IP address is the recorded IP address is performed by comparing the IP address to a list of IP addresses from packet sources, such that if the IP address is included in the list, the IP address is the recorded IP address.

Most preferably, if the passed IP packet is an RTP packet, the RTP packet is stored. Also most preferably, if the passed IP packet is an RTCP packet, the RTCP packet is stored.

Preferably, the storing of the data packet is effected according to the type of the data packet.

According to another preferred embodiment of the present invention, the step of storing the at least a portion of the communication session further comprises the steps of: (iv) retrieving the stored data packet to form a retrieved data packet; and (v) reconstructing at least a portion of the communication session according to the retrieved data packet.

Preferably, the second protocol suite is an IP protocol suite, and the step of retrieving the data packet includes the steps of: (A) receiving a source IP address of the packet source, a start time of the communication session, and an end time of the communication session; and (B) selecting at least one communication session according to the source IP address, the start time and the end time.

Also preferably, the step of reconstructing at least a portion of the communication session includes displaying audio data.

Alternatively and also preferably, the step of reconstructing at least a portion of the communication session includes displaying video data.

More preferably, the step of reconstructing at least a portion of the communication session further comprises the steps of: (A) retrieving substantially only RTP packets; (B) examining a header of the RTP packets to determine a time stamp for each of the RTP packets; and (C) displaying the RTP packets in an order according to the time stamp.

Hereinafter, the term "communication session" includes both a conversation, in which at least two parties converse by exchanging audio and/or video information in "real time", and a message, in which at least one party records such audio and/or video information for reception by at least one other party at a later date.

Hereinafter, the term "Internet" is used to generally designate the global, linked web of thousands of networks which is used to connect computers all over the world. As used herein, the term "intranet" includes other types of computer networks, such as LAN (local area networks) or WAN (wide area networks). The term "computer network" includes any connection between at least two computers which permits the transmission of data, including both Internet and intranet. The term "regular telephony network" includes POTS (plain old telephone system) and substantially any other type of telephone network which provides services through a regular telephone services provider, but which specifically excludes audio and/or video communication performed through any type of computer network.

Hereinafter, the term "computer" includes, but is not limited to, personal computers (PC) having an operating system such as DOS, Windows™, OS/2™ or Linux; Mackintosh™ computers; computers having JAVA™-OS as the operating system; and graphical workstations such as the computers of Sun Microsystems™ and Silicon Graphics™, and other computers having some version of the UNIX operating system such as AIX or SOLARIS™ of Sun Microsystems™; or any other known and available operating system. Hereinafter, the term "Windows™" includes but is not limited to Windows95™, Windows 3.x™ in which "x" is an integer such as "1", Windows NT™, Windows98™, Windows CE™ and any upgraded versions of these operating systems by Microsoft Inc. (Seattle, Wash., USA).

Hereinafter, the term "logging" refers to the process of analyzing data packets on a network to locate audio and/or video data, and of recording such data in an organized system. Hereinafter, the term "display" includes both the visual display of video data, and the production of sound for audio data.

BRIEF DESCRIPTION OF THE DRAWINGS

The invention is herein described, by way of example only, with reference to the accompanying drawings, wherein.

DESCRIPTION OF BACKGROUND ART

Figure 1:
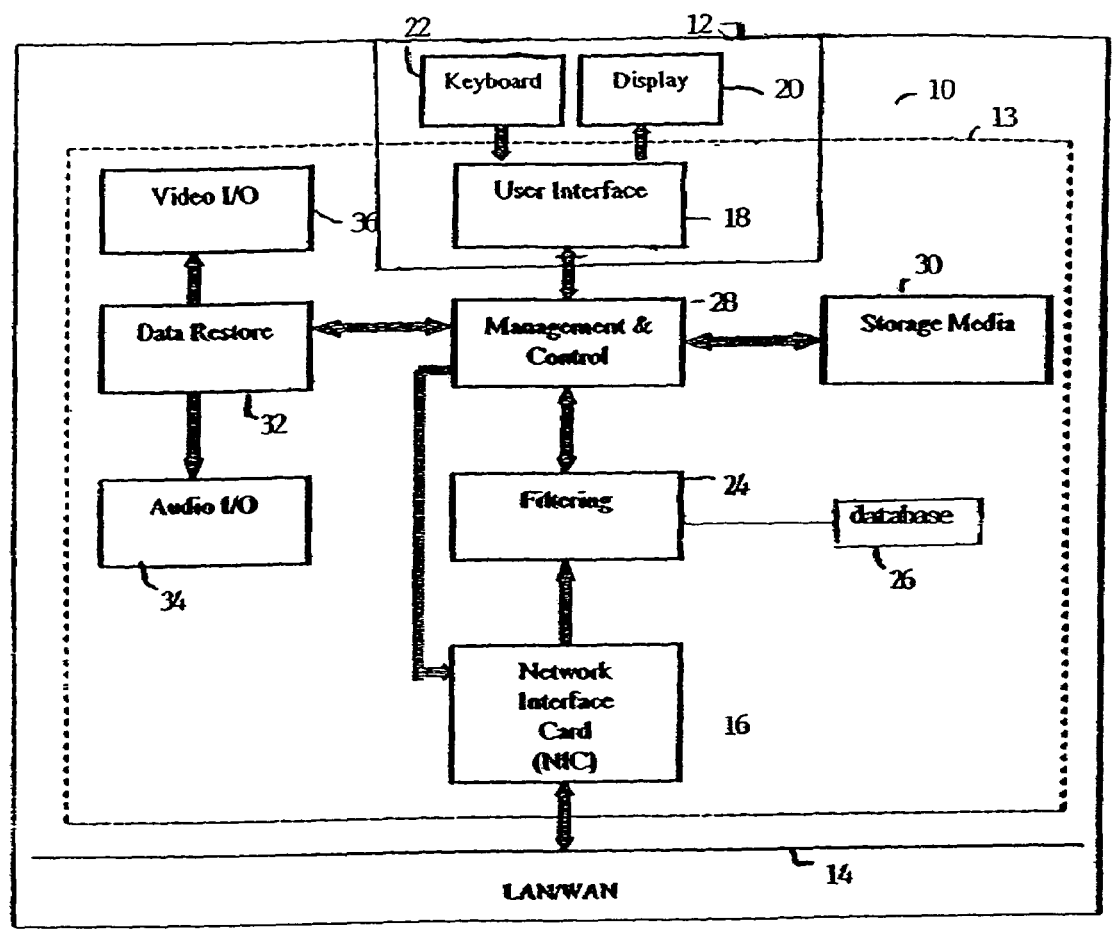
FIG. 1 is a schematic block diagram of an exemplary communication session monitoring system according to the present invention.

The following description is intended to provide a description of certain background methods and technologies which are optionally used in the method and system of the present invention. The present invention is specifically not drawn to these methods and technologies alone. Rather, they are used as tools to accomplish the goal of the present invention, which is a system and a method for analyzing data packets on a computer network, for selectively recording audio and video data packets, for organizing this stored information and for displaying the stored information upon request, such that communication sessions with computer network-based "telephone" systems can be logged.

The system and method of the present invention is particularly intended for operation with computer networks constructed according to the ITU-T Recommendation H.323 for visual telephone systems and equipment for local area networks which provide a non-guaranteed quality of service. Recommendation H.323 is herein incorporated by reference in order to further describe the hardware requirements and operating protocols for such computer networks, and is hereinafter referred to as "H.323".

H.323 describes terminals, equipment and services for multimedia communication over Local Area Networks (LAN) which do not provide a guaranteed quality of service. Computer terminals and equipment which fulfill H.323 may carry real-time voice, data and video, or any combination, including videotelephony.

The LAN over which such terminals communicate can be a single segment or ring, or optionally can include multiple segments with complex topologies. These terminals are optionally integrated into computers or alternatively are implemented in stand-alone devices such as videotelephones. Support for voice data is required, while support for general data and video data are optional, but if supported, the ability to use a specified common mode of operation is required, so that all terminals supporting that particular media type can communicate. The H.323 Recommendation allows more than one channel of each type to be in use. Other Recommendations in the H.323-Series which are also incorporated by reference include H.225.0 packet and synchronization, H.245 control, H.261 and H.263 video codecs, G.711, G.722, G.728, G.729, and G.723 audio codecs, and the T.120-Series of multimedia communications protocols.

ITU-T Recommendation H.245.0 covers the definition of Media stream packetization and synchronization for visual telephone systems. ITU-T Recommendation H.245.0 defines the Control protocol for multimedia communications, and is hereinafter referred to as "H.245". H.245 is incorporated by reference as is fully set forth herein.

The logical channel signaling procedures of H.245 describes the content of each logical channel when the channel is opened. Procedures are provided for the communication of the functional capabilities of receivers and transmitters, so that transmissions are limited to information which can be decoded by the receivers, and so that receivers may request a particular desired mode from transmitters.

H.245 signaling is established between two endpoints: an endpoint and a multi-point controller, or an endpoint and a Gatekeeper. The endpoint establishes exactly one H.245 Control Channel for each call that the endpoint is participating in.

The channel must then operate according to H.245. Support for multiple calls and hence for multiple H.245 Control Channels is possible.

The RAS signaling function uses H.225.0 messages to perform registration, admissions, bandwidth changes, status, and disengage procedures between endpoints and Gatekeepers. In LAN environments that do not have a Gatekeeper, the RAS Signaling Channel is not used. In LAN environments which contain a Gatekeeper, such that the LAN includes at least one Zone, the RAS Signaling Channel is opened between the endpoint and the Gatekeeper. The RAS Signaling Channel is opened prior to the establishment of any other channels between H.323 endpoints.

The call signaling function uses H.225.0 call signaling to establish a connection between two H.323 endpoints. The Call Signaling Channel is independent from the RAS Channel and the H.245 Control Channel. The Call Signaling Channel is opened prior to the establishment of the H.245 Channel and any other logical channels between H.323 endpoints. In systems that do not have a Gatekeeper, the Call Signaling Channel is opened between the two endpoints involved in the call. In systems which contain a Gatekeeper, the Call Signaling Channel is opened between the end point and the Gatekeeper, or between the endpoints themselves as chosen by the Gatekeeper.

Corresponding to the various channels defined by H.323 are corresponding protocols that collectively constitute the H.323 protocol suite. These protocols include the H.225 and H.245 protocols for session setup and the RTP and RTCP protocols for the actual data exchange.

DESCRIPTION OF THE PREFERRED EMBODIMENTS

The present invention provides a system and a method for analyzing data packets on a computer network, for selectively recording audio and video data packets, for organizing this stored information and for displaying the stored information upon request, such that communication sessions with computer network-based "telephone" systems can be logged.

The principles and operation of a method and a system according to the present invention may be better understood with reference to the drawings and the accompanying description.

Referring now to the drawings, FIG. 1 is a block diagram of an exemplary system for logging and displaying audio and/or visual data from communication sessions performed over a computer network. A computer logging system 10 features a user computer 12 connected to a communication session management unit 13. Communication session management unit 13 is in turn connected to an intranet 14 through a network interface card (NIC) 16.

User computer 12 includes a user interface 18, which is preferably a GUI (graphical user interface), which is displayed on a display unit 20. User interface 18 preferably enables the user to enter such information as the definition of the parties whose calls should to be monitored and/or logged, and which also preferably enables the user to enter at least one command for retrieving and displaying a communication session.

Display unit 20 is preferably a computer monitor. The user is able to interact with user computer 12 by entering data and commands through a data entry device 22. Data entry device 22 preferably includes at least a keyboard or a pointing device such as a mouse, and more preferably includes both a keyboard and a pointing device. According to one preferred embodiment of the present invention, user computer 12 is a PC (personal computer). Alternatively and preferably, user computer 12 is a "thin client" such a net computer which is a computer able to communicate on an IP-based network. One example of such a net computer is the JavaStation™ (Sun Microsystems). The advantage of such net computers is that they allow the user to interact with complex, sophisticated software programs, yet generally do not have all of the powerful computing capabilities of currently available PC computers.

Intranet 14 could be a LAN or a WAN, for example. The connection between communication session management unit 13 and intranet 14 occurs through NIC 16. NIC 16 is preferably any standard, off-the-shelf commercial product which enables communication session management unit 13 to be connected to any suitable computer network (for example, Etherlink II ISA/PCMCIA Adapter or Etherlink III PCI Bus-Master Adapter (3c590) of 3-Com™, or NE2000 Adapter of Novell™ or any other such suitable product). Examples of such suitable computer networks include, but are not limited to, any standard LAN such as Ethernet (IEEE Standard 802.3), Fast Ethernet (IEEE Standard 802.10), Token Ring (IEEE Standard 802.5) and FDDI.

All data packet traffic on intranet 14 is passed to a filtering module 24 through NIC 16. As shown in more detail in FIG. 3 below, filtering module 24 screens the data packets in order to determine which data packets fulfill the following criteria. Briefly, the data packets should be IP packets with headers according to the H.225 and H.245 standards, indicating voice and/or video traffic. As noted previously, these standards define media stream packet construction and synchronization for visual telephone systems and the control protocol for multimedia communications.

Filtering module 24 then preferably passes substantially only those data packets which meet these criteria to a management module 28. In the Zone Configuration of the system of the present invention, shown in FIG. 7 below, filtering module 24 preferably also transfers messages from other communication session management units.

Management module 28 receives the data packets passed through by filtering module 24, and analyzes the received data packets. Optionally and preferably, a database 26 stores such information as the IP addresses of parties whose communication sessions should be logged, as well as the conversion table associating each party with at least one IP address, for example. The stored list of IP addresses representing those parties whose calls should be logged is preferably user-defined. As used herein, the term "party" refers to a person or persons communicating through a computer network-based telephone system. The latter preferred requirement significantly reduces the amount of data stored by including only data which is of interest to the user. Management module 28 analyzes and manages data in accordance with the applicable H.225 and H.245 specifications, including the H.245 control function, RAS signaling function and call signaling function, substantially as described above in the "Description of the Background Art" section.

Management module 28 analyzes the packets in order to determine the specific communication session to which the data packets belong, the type of data compression being used (if any), and whether the data packets were sent from an IP address which should be monitored. Management module 28 must perform this analysis since filtering module 24 simply passes all data packets which fulfill the criteria described briefly above (see FIGS. 3A-3D for more detail). Since these packets are passed without regard to any of the information stored in database 26, management module 28 must compare the rules of database 26 to the information present in the packet header of each packet in order to determine whether the received packet should be stored.

Those received packets which fulfill the rules of database 26 are then stored in a storage medium 30, which is preferably a high capacity digital data storage device such as a hard disk magnetic storage device, an optical disk, a CD-ROM, a ZIP or DVD drive, or a DAT cassette, or a combination of such devices according to the operational needs of specific applications, or any other suitable storage media. Preferably, the specific communication session or "telephone call", with which each data packet is associated, is also stored in order for that session to be reconstructed and displayed at a later time.

Upon request by the user, management module 28 can then retrieve one or more data packets from storage medium 30 which are associated with one or more communication sessions. The retrieved packet or packets are then transferred to a data restore module 32. Data restore module 32 is preferably capable of manipulating these retrieved packets to restore a particular communication session by using the RTP (Real Time Protocol). As described in further detail below with regard to FIGS. 4C and 5, in those systems which follow the RTP, the data packets are sent with a time stamp in the header rather than just a sequence number. Such a time stamp is necessary for audio and video stream data, in order for the data packets to be reassembled such that the overall timing of the stream of data is maintained. Without such a time stamp, the proper timing would not be maintained, and the audio or video streams could not be accurately reconstructed.

The communication sessions are restored from the reconstructed streams of data packets by using the applicable audio and/or video CODEC's. A CODEC is a non-linear method for the conversion of analog and digital data. Thus, an audio CODEC enables the digitized audio data in relevant data packets to be converted to analog audio data for display to the user as audible sounds, for example. Suitable CODEC's are described in greater detail below with regard to FIG. 5.

In order for the user to receive the display of the reconstructed communication session, system 10 preferably features an audio unit 34 and a video unit 36, collectively referred to as a "communication session display unit". More preferably, both audio unit 34 and video unit 36 are capable of both receiving audio or video input, respectively, and of displaying audio or video output. At the very least, audio unit 34 and video unit 36 should be able to display audio or video output, respectively. For example, audio unit 34 could optionally include an microphone for input and a speaker or an earphone for output. Video unit 36 could optionally include a video monitor or display screen for output and a video camera for input, for example.

Figure 2:
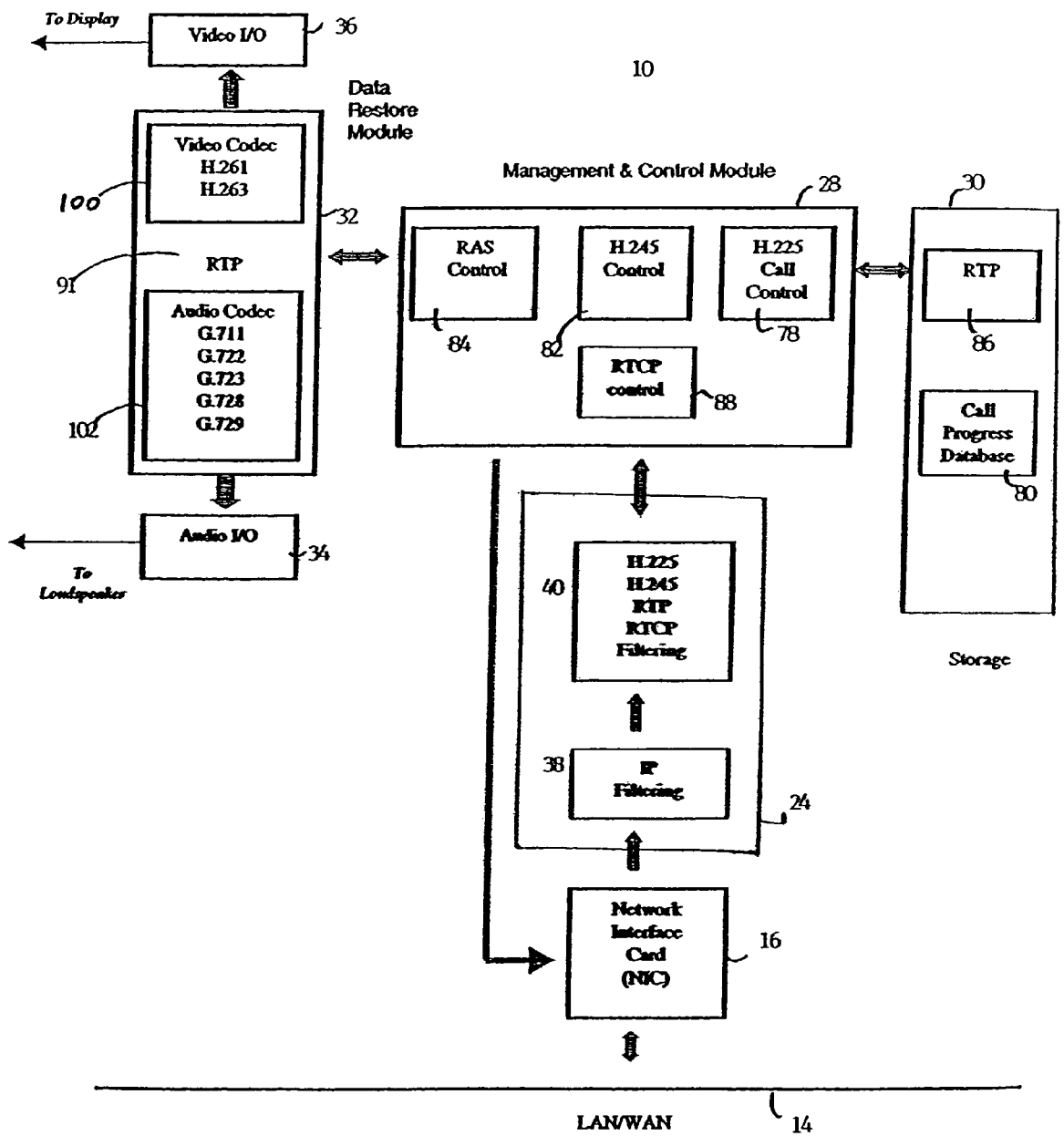
FIG. 2 is a schematic block diagram of the software modules required for operating the system of FIG. 1.

FIG. 2 is a schematic block diagram of system 10 of FIG. 1, showing the overall system of software modules of system 10 in more detail. Reference is also made, where appropriate, to flow charts showing the operation of these software modules in more detail (FIGS. 3A-3D and FIG. 5), as well as to descriptions of the headers of the different types of data packets (FIGS. 4A-4D).

As shown, system 10 again includes a connection to intranet 14 through NIC 16. As the packets are transmitted through intranet 14, NIC 16 intercepts these data packets and passes them to filtering module 24.

Figure 4A:
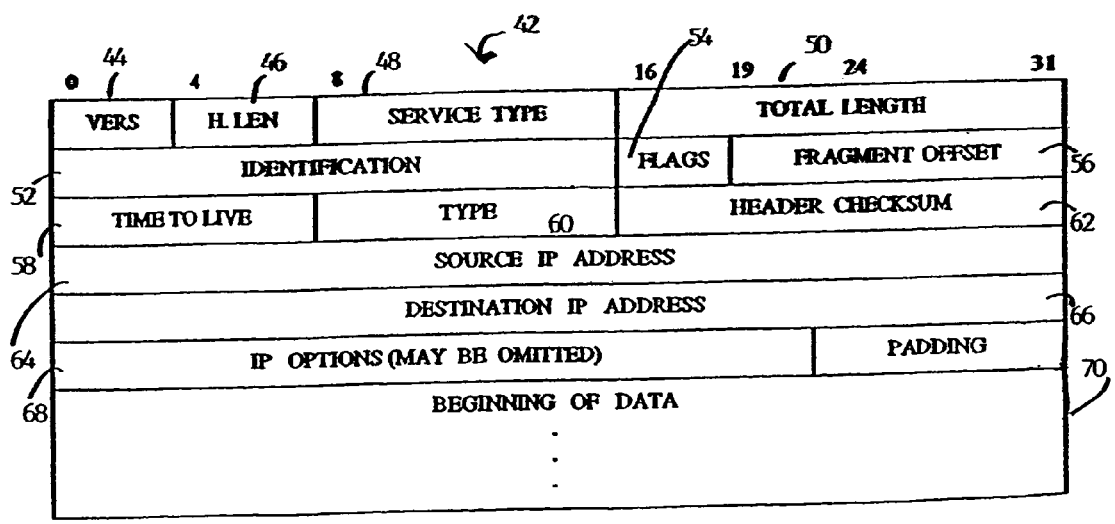
FIGS. 4A-4D are schematic block diagrams showing the headers of H.225 (FIG. 4A), H.245 (FIG. 4B), RTP (FIG. 4C) and RTCP (FIG. 4D) packets, as they relate to the present invention.
Figure 4B:
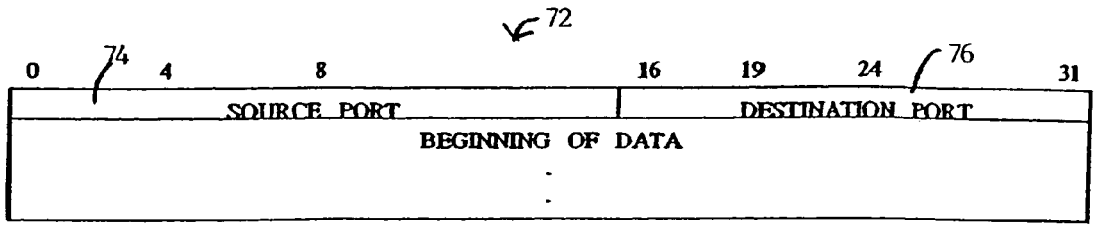

Filtering module 24 has two components. A first filtering component 38 examines the header of the data packet, which should be an IP type packet with the correct header, as shown in FIG. 4A below. Next, first filtering component 38 passes the data packet to a second filtering component 40. Second filtering component 40 then determines the type of IP data packet, which could be constructed according to the H.225, H.245, RTP or RTCP standards.

Figure 3A:
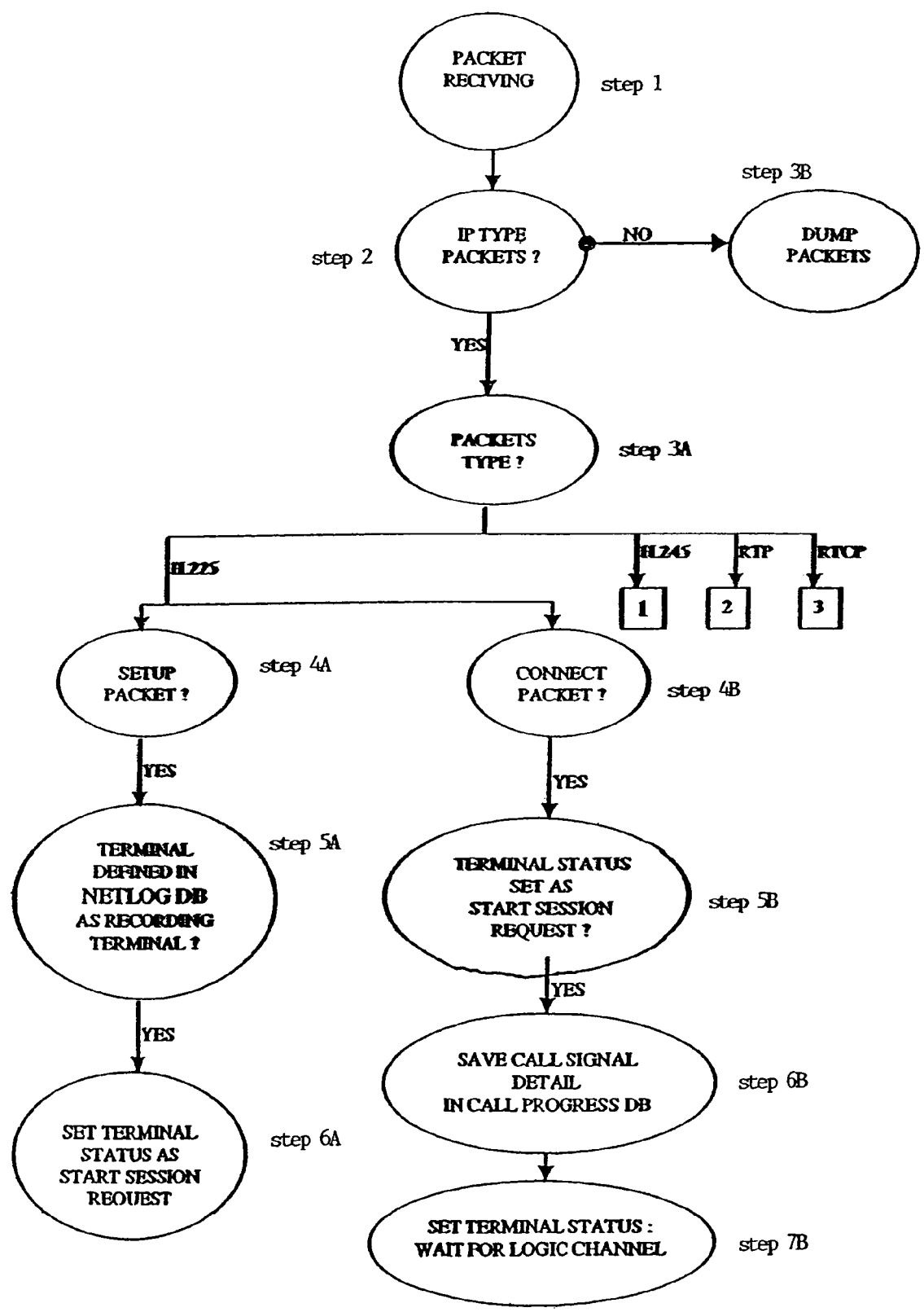
FIGS. 3A-3D are flowcharts of exemplary filtering and recording methods according to the present invention.

As shown with reference to FIG. 3A, first filtering component 38 and second filtering component 40 operate as follows. In step one, a packet is received by filtering module 24. The packet is given to first filtering component 38, which then determines whether the packet is an IP type packet in step two. Such a determination is performed to the structure of the header of the data packet, an example of which is shown in FIG. 4A. A header 42 is shown as a plurality of boxes, each of which represents a portion or "field" of the header. The number of bytes occupied by each portion is also shown, it being understood that each layer consists of 32 bits. The first portion of the header, a "VERS" portion 44, is the protocol version number. Next, an "H. LEN" portion 46 indicates the number of 32-bit quantities in the header. A "SERVICE TYPE" portion 48 indicates whether the sender prefers the datagram to travel over a route with minimal delay or a route with maximal throughput. A "TOTAL LENGTH" portion 50 indicates the total number of octets in both the header and the data.

In the next layer, an "IDENTIFICATION" portion 52 identifies the packet itself. A "FLAGS" portion 54 indicates whether the datagram is a fragment or a complete datagram. A "FRAGMENT OFFSET" portion 56 specifies the location of this fragment in the original datagram, if the datagram is fragmented. In the next layer, a "TIME TO LIVE" portion 58 contains a positive integer between 1 and 255, which is progressively decremented at each route traveled. When the value becomes 0, the packet will no longer be passed and is returned to the sender. A "TYPE" portion 60 indicates the type of data being passed. A "HEADER CHECKSUM" portion 62 enables the integrity of the packet to be checked by comparing the actual checksum to the value recorded in portion 62.

The next layer of header 42 contains the source IP address 64, after which the following layer contains the destination IP address 66. An optional IP OPTIONS portion 68 is present, after which there is padding (if necessary) and a data portion 70 of the packet containing the data begins.

The structure of the header of the data packet is examined by first filtering component 38 to determine whether this header has the necessary data fields in the correct order, such that the header of the data packet has a structure according to header 42. First filtering component 38 only allows those packets with the correct header structure to pass, as shown in step 3A. Otherwise, the packets are dumped as shown in step 3B.

Figure 3B:
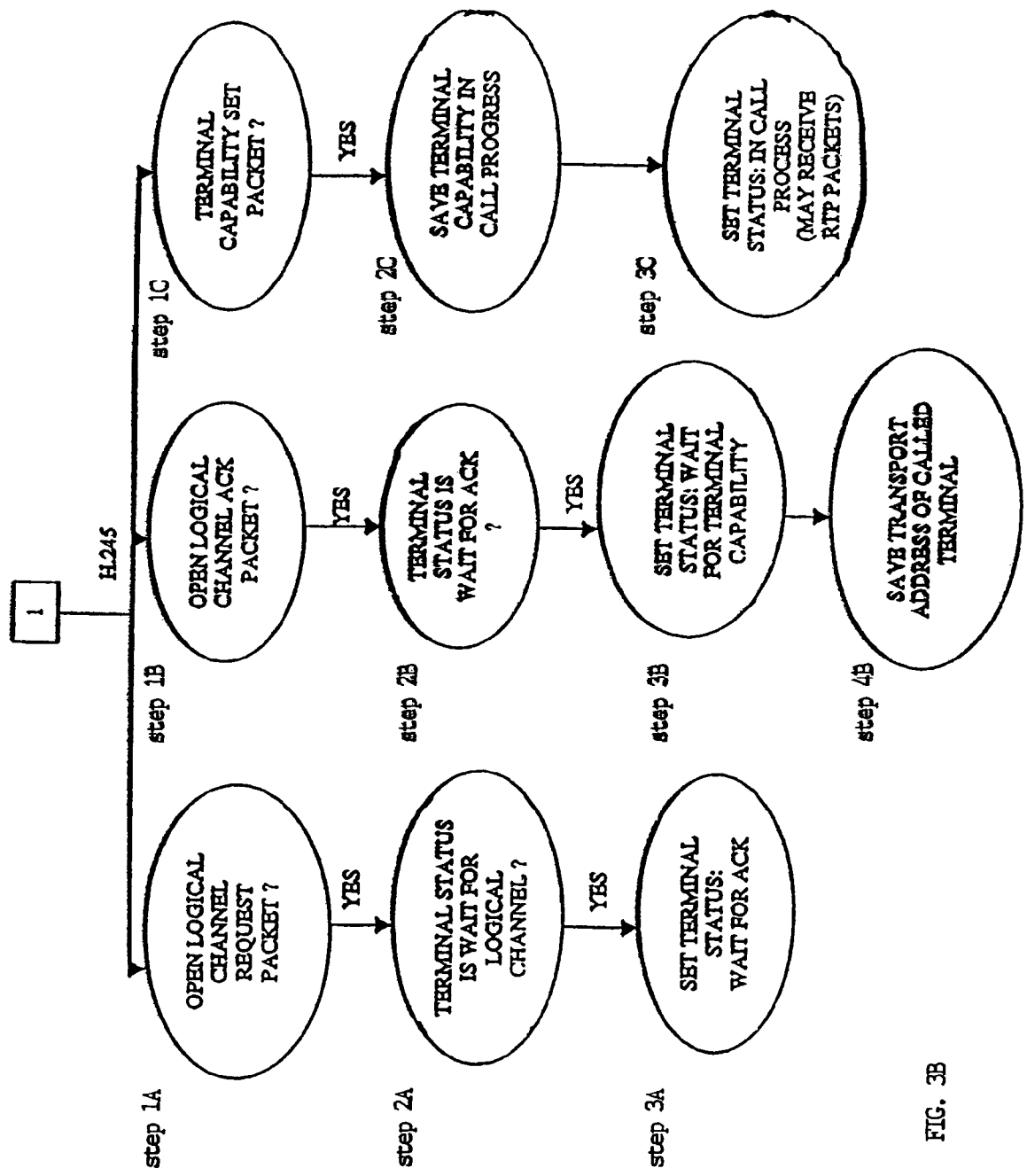
Figure 3C:
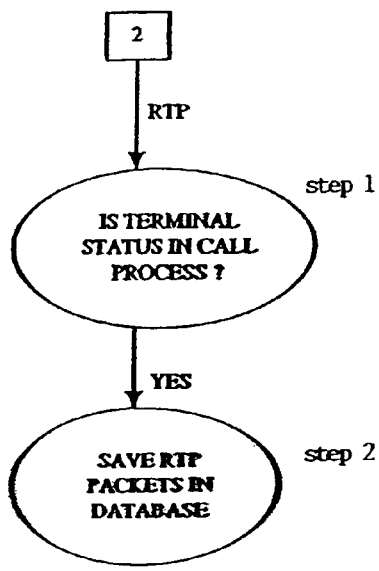
Figure 3D:
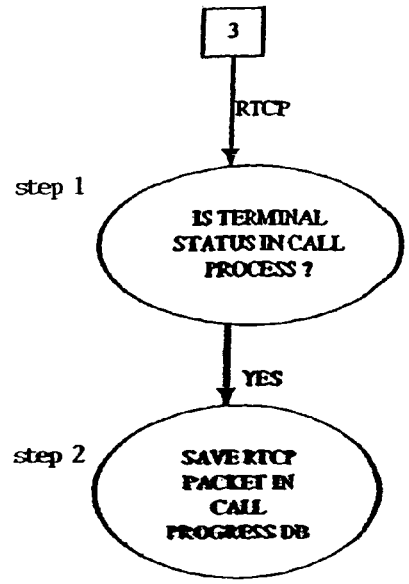

Those packets with the correct header, or "IP packets", are then passed to second filtering component 40. Second filtering component 40 then performs the remainder of the filtering steps. In step 3A, second filtering component 40 examines the IP packets to determine their type from the data portion of the packet as shown in FIG. 4A. The packets could be in one of four categories: H.225, H.245, RTP and RTCP. The steps of the method for H.225 packets are shown in FIG. 3A, while the procedures for the remaining packet types are shown in FIGS. 3B-3D, respectively.

Once the type of the packet has been determined, both the packet itself and the information regarding the type of packet are both passed to management module 28, as shown in FIG. 2. The packet is then passed to the relevant component within management module 28, also as shown in FIG. 2, for the recording process to be performed. The recorded packets are stored in storage module 30, as described in greater detail below with regard to FIGS. 3C and 3D.

If the packet has been determined to be an H.225 packet according to the header of the packet (see FIG. 4B), the packet is passed to an H.225 call control module 78 within management module 28, as shown in FIG. 2. The steps of the management method are as follows, with reference to FIG. 3A. In step 4A of FIG. 3A, the H.225 packet is examined to see if it is a setup packet, which is determined according to the structure of the data in the packet. This structure is specified in the H.225.0 recommendation, and includes at least the following types of information:

protocolIdentifier (the version of H.225.0 which is supported);

h245Address (specific transport address on which H.245 signaling is to be established by the calling endpoint or gatekeeper);

sourceAddress (the H.323_ID's for the source);

sourceInfo (contains an EndpointType to enable the party being called to determine whether the call includes a gateway or not); and destinationAddress (this is the address to which the endpoint wants to be connected).

Other types of data are also required, as specified in the H.225.0 Recommendation. This data structure enables H.225 call control module 78 to determine whether the packet is a setup packet.

If this packet is a setup packet, then the first branch of the method is followed. The source port is taken from a source port field 74 of an H.225 header 72, and the destination port is taken from a destination port field 76 (see FIG. 4B). In step 5A, database 26 of FIG. 1 is then examined to determine whether either of the corresponding terminals is defined as a recording terminal; that is, whether communication sessions initiated by the IP address of this terminal should be monitored. If true, then in step 6A, the terminal status is set as a start session request from the terminal corresponding to the source port.

Alternatively, the packet is examined to see if it is a connect packet in step 4B, which is determined according to the structure of the data in the packet. This structure is specified in the H.225.0 recommendation, and includes at least the following types of information:

protocolIdentifier (the version of H.225.0 which is supported);

h245Address (specific transport address on which H.245 signaling is to be established by the calling endpoint or gatekeeper);

destinationInfo (contains an EndpointType to enable the caller to determine whether the call includes a gateway or not); and conferenceID (contains a unique identifying number to identify the particular conference).

If the packet is a connect packet, then the second branch of the method is followed. In step 5B, the flag indicating the terminal status is examined to determine if the terminal status is set as a start session request. In step 6B, the details of the call signal are saved in a call progress database 78 of storage medium 30 (see FIG. 2). These details preferably include the source and destination IP addresses, the source and destination ports; the time at which the communication session was initiated, and any other relevant information. In step 7B, the status of the terminal is set to "wait for the logic channel".

If the packet has been determined to be an H.245 packet by second filtering component 40, the packet is passed to an H.245 call control module 82 within management module 28, as shown in FIG. 2. Such H.245 packets are necessary for H.245 signaling. H.245 signaling is established between two endpoints: an endpoint and a multi-point controller, or an endpoint and a Gatekeeper (see FIGS. 6 and 7 below for examples and a description of such endpoints). Each endpoint is capable of calling and of being called as part of a communication session. However, the system of the present invention only monitors, rather than initiating, such communication sessions. Thus, the system of the present invention uses the H.245 signaling to determine when the communication session has started in order to effectively record the necessary data packets for the storage and later reconstruction of the session.

The steps of the management method for H.245 packets are as follows, with reference to FIG. 3B. In step 1A of FIG. 3B, the H.245 packet is examined to determine if it is an open logical channel request packet. If it is, then in step 2A, the terminal status is examined to determine if the status is "wait for the logical channel". If so, then in step 3A the terminal status is set to "wait for acknowledgment".

Alternatively, the H.245 packet is examined to determine if it is an open logical channel acknowledgment packet, as shown in step 1B. If it is, then in step 2B, the terminal status is examined to determine if the status is "wait for acknowledgment". If so, then in step 3B the terminal status is set to "wait for terminal capability". In step 4B, the transport address of the "called" or destination terminal is saved. This transport address is taken from the destination port field 76 of header 72 (see FIG. 4B). It should be noted that H.225 and H.245 packets have identical header structures.

Also alternatively, the H.245 packet is examined to determine if it is a terminal capability set packet, as shown in step 1C. If it is, then in step 2C, the terminal capability is saved in call progress database 80 (see FIG. 2). In step 3C, the terminal status is set to "in call process", such that the communication session has been determined to be opened and such that management module 28 can now receive RTP data packets.

Figure 4C:
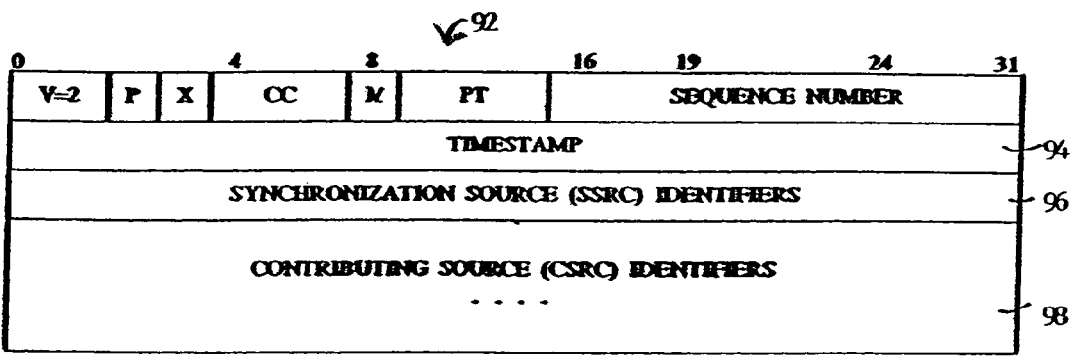

If the packet has been determined to be a RTP packet by second filtering component 40, the packet is passed to a RAS (registration, admissions and status) control module 84 within management module 28, as shown in FIG. 2. The steps of the management method for RTP packets are as follows, with reference to FIG. 3C. In step 1 of FIG. 3C, the terminal status is examined to see if it is "in call process". If so then in step 2, the RTP packets are saved in a RTP database 86 within storage medium 30 (see FIG. 2). FIG. 4C shows the structure of the RTP packet header, which can be used to identify the communication session from which the packet was taken.

Figure 4D:
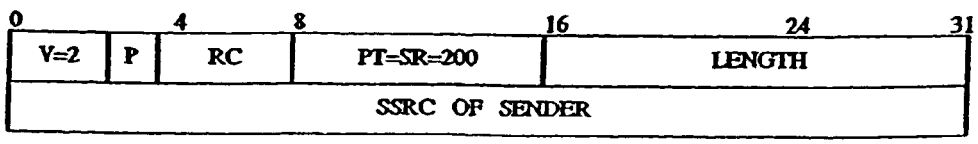

Finally, if the packet has been determined to be a RTCP packet by second filtering component 40, the packet is passed to a RTCP control module 88 within management module 28, as shown in FIG. 2. The steps of the management method for RTCP packets are as follows, with reference to FIG. 3D. In step 1 of FIG. 3D, the terminal status is examined to see if it is "in call process". If so then in step 2, the RTCP packets are saved in call progress database 80 within storage medium 30 (see FIG. 2). FIG. 4D shows the structure of the RTCP packet header, which can be used to identify the communication session from which the packet was taken.

Thus, FIGS. 3A-3D illustrate the method of the present invention with regard to the filtering and storage of data packets which constitute the recorded communication session, as recorded by the system of the present invention as shown in FIGS. 1 and 2. Of course, in addition to recording such communication sessions, the system of the present invention is also able to retrieve and to replay these communication sessions to the user. The stored communication session, composed of stored data packets, can be retrieved and displayed by data restore unit 32 of FIG. 2, in conjunction with audio unit 34 and video unit 36. The method of retrieving and replaying sessions of interest is shown in FIG. 5, while certain other relevant portions of the system of the present invention are shown in FIG. 2.

Figure 5:
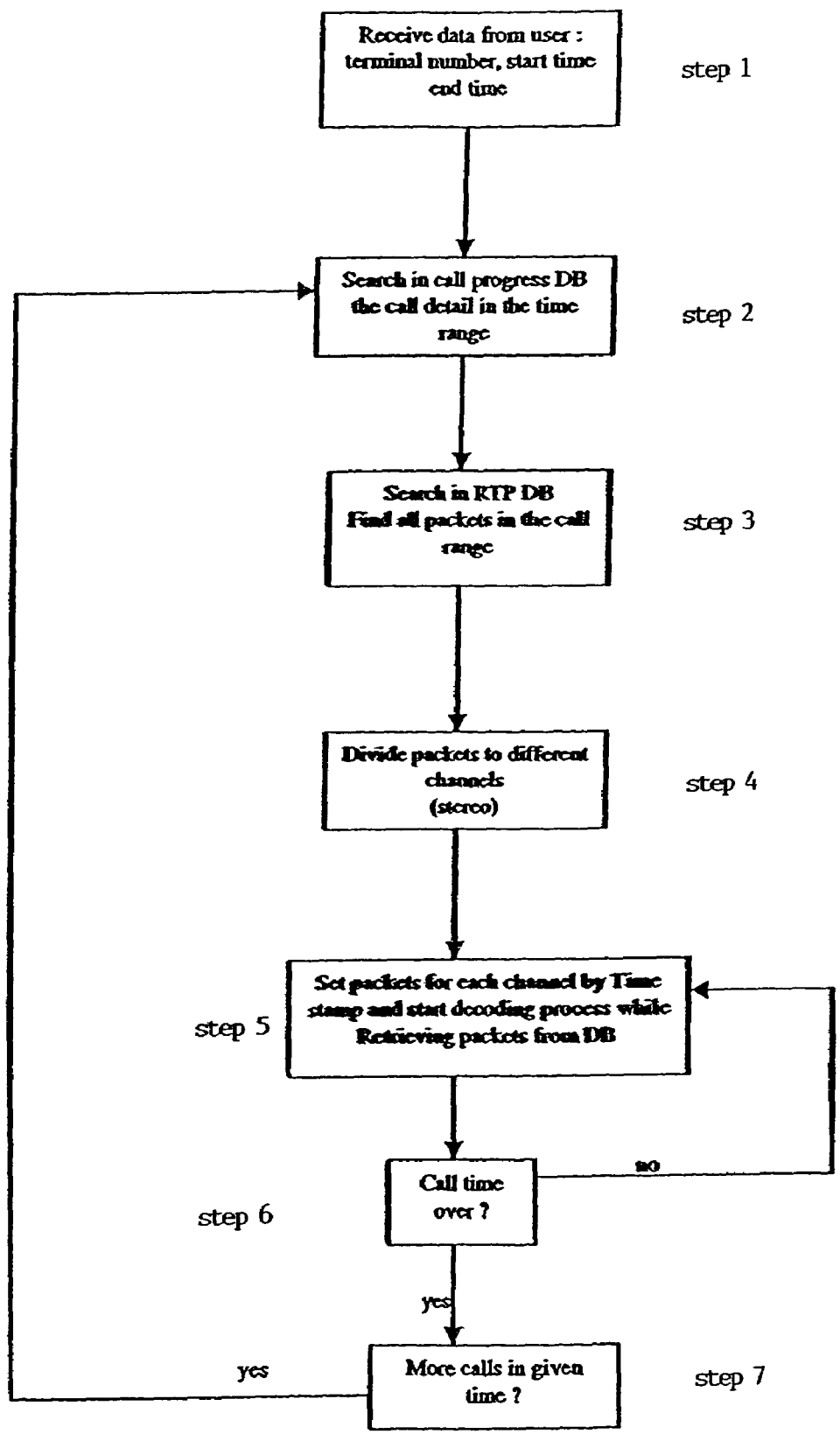
FIG. 5 is a flowchart of an exemplary communication session playback method according to the present invention.

In step 1 of FIG. 5, the user inputs the information concerning the communication session which is to be retrieved and replayed. This information preferably includes the terminal number, or other designation information concerning at least one of the parties of the communication session of interest; the time at which the session started; and the time at which the session ended. However, alternatively other information could be included in place of this information, as long as sufficient information is provided for the communication session of interest to be identified.

In step 2 of FIG. 5, call progress database 80 (see FIG. 2) is searched by data restore unit 32 in order to find the details of the communication session(s) in the specified time range. These details are then compared to the information entered by the user to locate at least one communication session of interest in the call range.

In step 3, RTP database 86 of storage medium 30 (see FIG. 2) is searched, again by data restore unit 32, to find substantially all data packets from the at least one communication session in the specified call range. Optionally and preferably, in step 4, if the audio portion communication session was recorded in stereo, then the data packets are divided into different audio channels.

In step 5, the data packets are restored by data restore unit 32 by an RTP (Real Time Protocol) software module 91 within data restore unit 32. RTP software module 91 orders the data packets within each channel according to the time stamp of each packet. As shown in FIG. 4C, an RTP packet header 92 features several important fields: a timestamp field 94, a synchronization source (SSRC) identifiers field 96 and a contributing source (CSRC) identifiers field 98. SSRC field 96 is used to determine the source of the RTP packets (the sender), which has a unique identifying address (the SSRC identifier). The CSRC identifier in CSRC field 98 is used in a conference with multiple parties, and indicates the SSRC identifier of all parties. Timestamp field 94 is used by RTP software module 91 to determine the relative time at which the data in each packet should be displayed.

For example, preferably the audio stream data of the audio speech of one person is synchronized to that person's lip movements as shown in the video stream, a process known as "lip synchronization". Such synchronization requires more than simply replaying audio and video data at certain relative time points, since the audio and video data packets may not arrive at the same time, and may therefore have slightly different timestamps.

Once the data packet has been correctly synchronized, the control of the display of the audio data is then performed by an audio component 102 of data restore unit 32 according to one or more audio CODEC's (see FIG. 2). The control of the display of the video data is then performed by a video component 100 of data restore unit 32 according to one or more video CODEC's (see FIG. 2).

Suitable CODEC's include, but are not limited to, an audio codec using *CCITT Recommendation G.711* (1988), *Pulse Code Modulation (PCM) of voice frequencies*; an audio codec using *CCITT Recommendation G.722* (1988), *7 kHz audio-coding within 64 kbit/s*; an audio codec using *ITU-T Recommendation G.723.1* (1996), *Speech coders: Dual rate speech coder for multimedia communications transmitting at 5.3 and 6.3 Kbps*; an audio codec using *CCITT Recommendation G.728* (1992), *Coding of speech at 16 Kbps using low-delay code excited linear prediction*; an audio codec using *ITU-T Recommendation G.729* (1996), *Coding of speech at 8 Kbps using conjugate structure algebraic code-excited linear-prediction (CS-ACELP)*; a video codec using ITU-T Recommendation H.261 (1993), *Video codec for audiovisual services at p×64 kbit/s*; a video codec using ITU-T Recommendation H.263 (1996), *Video coding for low bit rate communication*; and substantially any other similar coding standard.

As shown in FIG. 2, the audio data is displayed by audio unit 34, which could include a loudspeaker, for example. The video data is displayed by video unit 36, which could include a display monitor screen, for example. Step 5 of FIG. 5 is then preferably repeated, such that substantially the entirety of the communication session is displayed. As shown in step 6, each data packet of the communication session is examined to see if the call time is over. If the individual session has not completed, preferably step 5 is repeated. Alternatively and preferably, if the call time is over, then call progress database 80 is searched to see if other communication sessions were recorded within the given time period, as shown in step 7. If there is at least one other such communication session, then preferably the method of FIG. 5 is repeated, starting from step 2.

Figure 6:
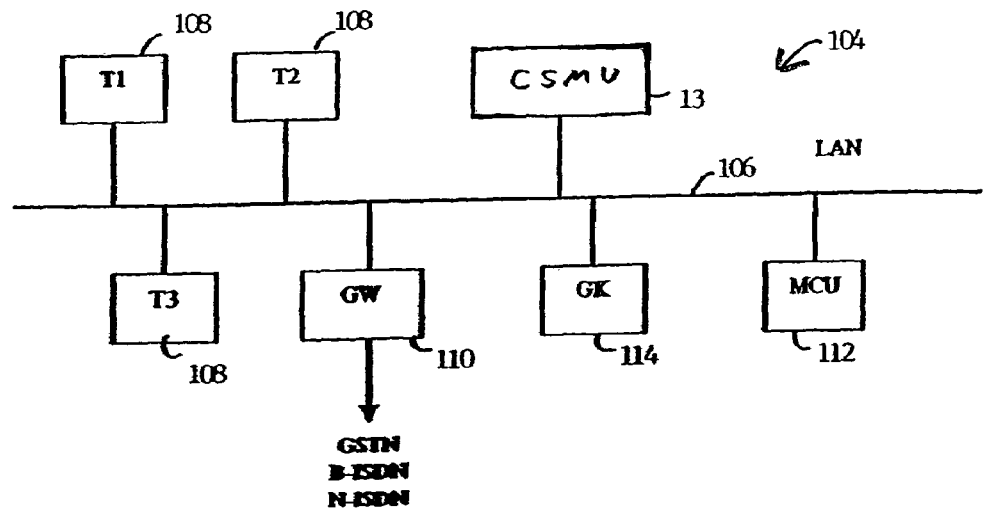
FIG. 6 is a schematic block diagram of an exemplary first embodiment of a basic system using the communication session monitoring system of FIGS. 1 and 2 according to the present invention.
Figure 7:
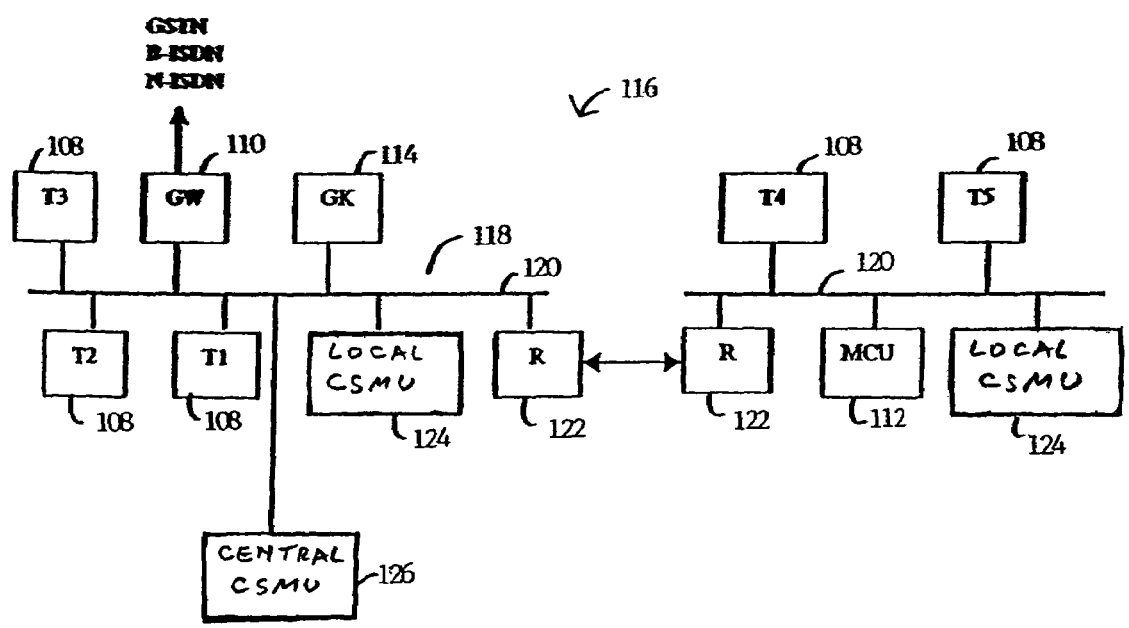
FIG. 7 is a schematic block diagram of an exemplary second embodiment of a zone system according to the present invention.

According to preferred embodiments of the present invention, several configurations of the computer logging system are possible, examples of which are shown in FIGS. 6 and 7.

According to a first embodiment of the system of the present invention, shown in FIG. 6, a typical basic configuration system 104 includes a single communication session management unit 13, substantially as shown in FIGS. 1 and 2, according to the present invention. Communication session management unit 13 manages communication in a stand-alone intranet such as a LAN 106. LAN 106 is connected both to communication session management unit 13 and to a plurality of terminals 108, designated as "T1", "T2" and so forth, which follow the H.323 protocol. Each terminal 108 is an endpoint on LAN 106 which provides for real-time, two-way communications with another terminal 108, a gateway 110, or a multipoint control unit (MCU) 112. This communication consists of control, indications, audio streams, video streams, and/or data. Terminal 108 is optionally only capable of providing such communication for audio only, audio and data, audio and video, or audio, data and video. As noted previously in the "Description of the Background Art" section, the H.323 entity could be a terminal which is capable of providing audio and/or video communication as a "LAN telephone", but could also be a stand-alone audio or video telephone.

Gateway 110 (GW) is constructed according to H.323 and is an endpoint on LAN 106 which provides for real-time, two-way communications between terminals 108 on LAN 106 and other suitable terminals on a WAN (not shown), or to another such Gateway (not shown). Other suitable terminals include those complying with Recommendations H.310 (H.320 on B-ISDN), H.320 (ISDN), H.321 (ATM), H.322 (GQOS-LAN), H.324 (GSTN), H.324M (Mobile), and V.70 (DSVD).

MCU 112 is an endpoint on LAN 106 which enables three or more terminals 108 and gateways 110 to participate in a multipoint conference.

Preferably, system 104 also features a gatekeeper (GK) 114, which is an H.323 entity on LAN 106 which provides address translation and controls access to LAN 106 for terminals 108, gateways 110 and MCUs 112. Gatekeeper 114 may also provide other services to terminals 108, gateways 110 and MCUs 112 such as bandwidth management and locating gateways 110. Preferably, gatekeeper 114 enables the IP address of terminals 108 on LAN 106 to be determined, such that the correct IP address can be determined "on the fly".

In addition, LAN 106 may support non audio visual devices for regular T.120 data applications such as electronic whiteboards, still image transfer, file exchange, database access, etc.

In basic system 104, a single, stand-alone communication session management unit 13 is used for monitoring, logging and retrieval of all audio and/or visual calls either between any two or more terminals 108 attached to LAN 106 or any call to which one or more of these terminals 108 is a party.

However, for the preferred embodiment of the system of FIG. 6 which includes gatekeeper 114, as well as for the system of FIG. 7, once the communication session has been opened, preferably RAS control module 84 also performs RAS signaling between the management control module and NIC 16 where necessary for the configuration of the system. Such signaling uses H.225.0 messages to perform registration, admissions, bandwidth changes, status, and disengage procedures between endpoints and gatekeepers. These messages are passed on a RAS Signaling Channel, which is independent from the Call Signaling Channel and the H.245 Control Channel. H.245 open logical channel procedures are not used to establish the RAS Signaling Channel. In LAN environments which contain a Gatekeeper (a Zone), the RAS Signaling Channel is opened between the endpoint and the Gatekeeper. The RAS Signaling Channel is opened prior to the establishment of any other channels between H.323 endpoints.

FIG. 7 shows a second embodiment of the system of the present invention as a zone bandwidth changes, status, and disengage procedures between endpoints and gatekeepers. These messages are passed on a RAS Signaling Channel, which is independent from the Call Signaling Channel and the H.245 Control Channel. H.245 open logical channel procedures are not used to establish the RAS Signaling Channel. In LAN environments which contain a Gatekeeper (a Zone), the RAS Signaling Channel is opened between the endpoint and the Gatekeeper. The RAS Signaling Channel is opened prior to the establishment of any other channels between H.323 endpoints.

FIG. 7 shows a second embodiment of the system of the present invention as a zone configuration system 116. A zone 118 is the collection of all terminals (Tx) 108, gateways (GW) 110, and multipoint control units (MCUs) 112 managed by a single gatekeeper (GK) 114. Zone 118 includes at least one terminal 108, but does not necessarily include one or more gateways 110 or MCUs 112. Zone 118 has only one gatekeeper 114 as shown. However, in the preferred embodiment shown, zone 118 is preferably independent of LAN topology and preferably includes multiple LAN segments 120 which are connected using routers (R) 122 as shown or other similar devices.

Each monitored LAN segment 120 has a local communication management unit 124 according to the present invention, of which two are shown. A central management unit 126 according to the present invention controls all local communication management units 124. In addition to centralized database and control services, central management unit 126 can be used for the real-time monitoring and off-line restoration of audio and/or video communication sessions from a single point. Central management unit 126 is optionally and preferably either a dedicated unit similar in structure to local communication management units 124 but without the storage capability, or central management unit 126 is alternatively and preferably integrated with local communication management units 124 to provide the functionality of both local communication management unit 124 and central management unit 126 in a single station. Local communication management units 124 are preferably either communication session management units 13 substantially as described in FIGS. 1 and 2, or alternatively and preferably are simpler units which lack the capability to retrieve and display a communication session locally.

In still another preferred embodiment of the present invention (not shown), multi-user operation based on Client/Server architecture is preferably supported for basic system 104 and zone system 116. An unlimited number of "Client" stations may be connected anywhere on the LAN, providing users with management and monitoring/retrieval capabilities determined by the authorization level of each specific user.

Figure 8:
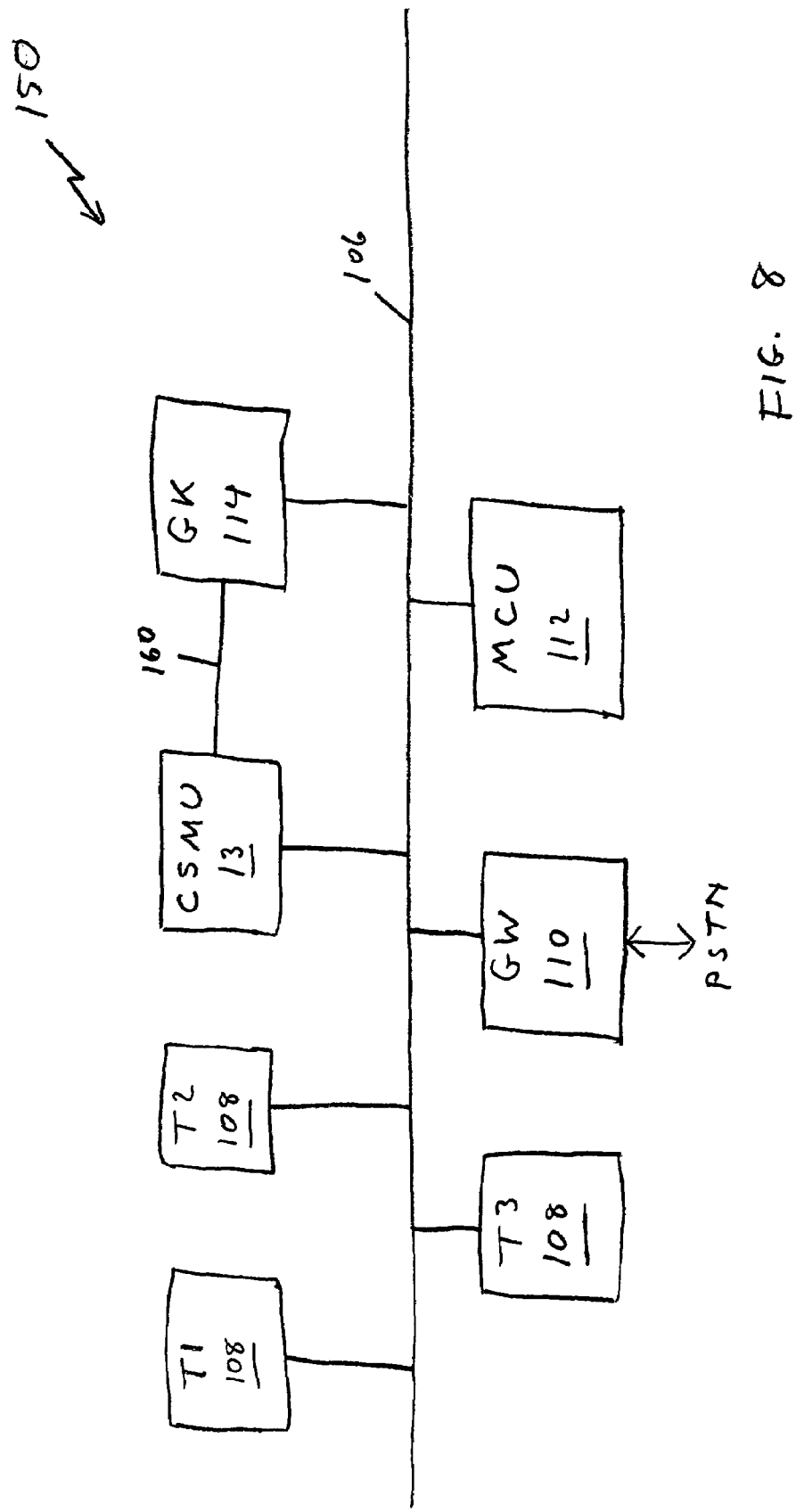
FIG. 8 is a schematic block diagram of an exemplary passive recording system according to another embodiment of the present invention.

Yet another preferred embodiment of the present invention, illustrated in FIG. 8, addresses the challenges of an Internet Protocol (IP) distributed switching environment.

Recording systems experience the following challenges when interfaced with an IP environment:

Because there is no central switching matrix, voice streams between any extension A and B can be routed via the WAN without providing a means to capture the calls at the site where the recording systems are located.

Because the IP network consists of switch boxes, routers and bridges, the network topology can have a negative influence on the recording.

Few multimedia IP protocol suites include encryption. In particular, the H.323 protocol suite lacks encryption. In order for the recording system to de-encrypt the signal, the recording system needs to act as a "legal" party with the recorded call. The only way to become a "legal" party with the recorded call is to turn the call into a conference call in which the recording system is one member of the conference.

Multimedia IP protocols define several types of audio and video CODECS (G.711, G.722, G.728, G.723, G.729, H.261 and H.263). Thus, during recording playback operation the recording system should have the capability of changing from one CODECS to another per the endpoint capability, if the voice or the video was recorded and stored using a different CODECS.

System 104 of FIG. 6 is intended for use in a standard H.323 environment. Terminals 108 conduct telephone conversations among themselves, or alternatively with POTS telephones via gateway 110. In order to make these calls, terminals 108 communicate with gatekeeper 114 in order to find the destination terminal or gateway on LAN using the RAS protocol to perform call setup under the H.225 protocol and to negotiate the RTP stream characteristics under the H.245 protocol. Note that these protocols all belong to the H.323 protocol suite. The communication with gatekeeper 114, under the RAS, H.225 and H.245 protocols, is the signaling part of the call and is used to establish the RTP or RTCP streams of the call which are used to carry the actual voice or video data. MCU 112 provides the ability to perform conferencing among three or more parties. All of the above communications are performed over LAN 106.

Communication session management unit 13 is connected on LAN 106 in such a way that communication session management unit 13 is able to sniff all the packets of a conversation, both signaling packets and RTP or RTCP packets. Prior art connection methods include:

1. using a hub, in which case all packets are passed to all ports in the hub; and
2. monitoring strategic ports of a switched hub by other ports on the switched hub.

Likely strategic ports under the second alternative are the ports of the switched hub to which one or more gateways 110 are connected, in which case all outgoing calls can be recorded. In this example, gateway 110 is connected to the monitored port of the switching hub and communication session management unit 13 is connected to the monitoring port of the switching hub.

Communication session management unit 13 sniffs the RTP and RTCP packets of the conversation and extracts the voice or video data from these packets. In order to associate these data with a telephone extension number, or with the name of the person at the extension, the H.323 signaling must be analyzed. This solution does not work in Voice Over IP systems in which the signaling protocols are not within the H.323 protocol suite. Such signaling protocols include SIP, MGCP and Cisco's proprietary Skinny protocol.

A third embodiment 150 of the system of the present invention, that does not depend on the signaling protocol, is illustrated in FIG. 8. In system 150, the voice or video data are recorded, as in system 104 of FIG. 6, by having communication session management unit 13 sniff the RTP and RTCP packets. The innovation of system 150 is the addition of a link 160 between communication session management unit 13 and gatekeeper 114. Specifically, link 160 connects management module 28 of communication session management unit 13 to gatekeeper 114. Link 160 provides CTI (computer telephone integration) data or CDR (call data records) data to communication session management unit 13. These data replace the data which are retrieved by analyzing the H.323 protocols in system 104 of FIG. 6. These data are used by communication session management unit 13 to associate calls with extension numbers, callers' names or any other information that arrives via link 160.

Link 160 is a logical link that may be implemented in several ways, including:
1. On the same LAN that is used for Voice Over IP calls. In this manner, no additional hardware is needed on communication session management unit 13.
2. On a separate LAN from the LAN that is used for Voice Over IP calls. Under this alternative, communication session management unit 13 includes an additional network adapter, similar to NIC 16, that is used specifically for link 160.
3. On a serial connection using one of the serial ports of communication session management unit 13.

Because link 160 is a logical link, FIG. 8 serves to illustrate all three of these implementations.

System 150 of FIG. 8 has the following advantages:
1. There is no dependence on the type of signaling used in the Voice Over IP system. System 150 works with all signaling types.
2. Link 160 may transfer more information than can be retrieved from the H.323 signaling protocols. This information may include, for example, application-specific information such as insurance policy number in the case of system 150 being a component of an insurance company's call center.
3. Because fewer messages arrive at communication session management unit 13, system 150 reduces the burden on the CPU of communication session management unit 13, resulting in an increase in the number of channels that can be recorded simultaneously.

System 150 of FIG. 8 may be reduced to practice using the following commercially available components:
Gatekeeper 114: Call Manager 3.0™ by Cisco Systems, Inc., San Jose Calif.
Link 160: A JTAPI™ connection of the Call Manager 3.0™

Terminals 108: VIP 30™ or SP 12+™, both by Cisco Systems, Inc., San Jose Calif.
Gateway 110: Catalyst 3640™, by Cisco Systems, Inc., San Jose Calif.
MCU 112: Conference Plug-In on the Call Manger 3.0™
Communication session management unit 13: Nicelog™, by Nice Systems Ltd., Ra'anana, Israel
LAN 106: Switch Hub Catalyst 2924™, by Cisco Systems, Inc., San Jose Calif.

It will be appreciated that the above descriptions are intended only to serve as examples, and that many other embodiments are possible within the spirit and the scope of the present invention.

What is claimed is:

1. A management control unit connected to a computer network for use in a computer network-based telephone communication session that comprises voice over IP transmission of data packets, consisting of:
    (a) a first, bi-directional communication link to a user computer having a user interface, a keyboard, and a display, the first link conveying a request from a user to the management control unit and displaying at least a portion of the computer network-based telephone communication session;
    (b) a second communication link to the computer network-based telephone communication session for connecting to the computer network and for receiving the data packets from the computer network;
    (c) a third, bi-directional communication link to a storage unit that stores at least a portion of the data packets that are associated with the voice over IP transmission;
    (d) a fourth link between a gatekeeper and the management unit that transmits CTI or CDR data related to the data packets of the voice over IP transmission of the computer network-based telephone communication session, free of any dependence on any communication protocol;
    (e) a database that stores call details transmitted on said fourth link and included in the CTI or CDR data;
    (f) a fifth, bi-directional communication link to a data restore module, the data restore module having at least a video codec or an audio codec and being configured to restore at least the portion of the voice over IP transmission of the computer network-based telephone communication session;
    (g) means for retrieving from the storage unit one or more data packets and for transferring same across the fifth communication link to the data restore unit in response to the request by the user at the user computer; and
    (h) means for filtering the data packets that comprise the voice over IP transmission of the computer network-based telephone communication session, wherein the filtering means is in communication with the database and the computer network-based telephone communication session and is operative to select from among the data packets of the computer network-based telephone communication session such that the filtered data packets form at least a portion of the voice over IP transmission,
    wherein the storage unit stores the filtered data packets.

2. The management control unit of claim 1, wherein the portion of the data packets that are associated with the voice over IP transmission of the computer network-based telephone communication session comprise RTP or RTCP packets.

3. A system for managing a communication session over a computer network that includes a gate keeper, the system comprising:

(a) a network connector for connecting to the computer network and for receiving data packets from the computer network;
(b) a filtering unit for filtering said data packets, such that said data packets form at least a portion of the communication session and such that said data packets are selected data packets;
(c) a management unit for receiving said selected data packets and for storing said selected data packets, such that said selected data packets are stored data packets; and
(d) a storage medium for receiving and for storing said stored data packets from said management unit, such that said at least a portion of the communication session is stored;

characterized in that said filtering unit accepts said data packets substantially only if said data packets contain data selected from the group consisting of audio data and video data, and in that the system further comprises:
(e) a link, between the gatekeeper and said management unit, for transferring information related to said data packets from the gatekeeper to said management unit.

4. The system of claim 3, further comprising:
(f) a data restore unit for retrieving and displaying said at least a portion of the communication session, said data restore unit requesting said data packets from said storage medium through said management unit, and said data restore unit reconstructing said data packets for displaying said at least a portion of the communication session.

5. The system of claim 4, wherein said data restore unit further comprises a communication session display unit for displaying said at least a portion of the communication session.

6. The system of claim 5, wherein said communication session display unit is selected from the group consisting of a video unit and an audio unit.

7. The system of claim 4, further comprising:
(g) a database connected to said filtering unit for storing filtering information, said filtering information including at least one IP address of a party whose communication sessions are monitored,
wherein said filtering unit accepts said data packets according to said filtering information, such that said filtering unit substantially only accepts said data packets if said data packets fulfill said filtering information.

8. The system of claim 7, further comprising:
(h) a user computer for receiving at least one command of a user and for displaying information to said user, such that said user determines said filtering information according to said at least one command of said user.

9. The system of claim 8, wherein the computer network is selected from the group consisting of a LAN (local area network) and a WAN (wide area network).

10. The system of claim 9, wherein the computer network is a LAN (local area network).

11. The system of claim 10, wherein said LAN is divided into at least two segments, the system further comprising:
(i) a local management unit for each segment, said local management unit including said filtering unit and said management unit; and
(j) a central management unit for controlling said local management units, said central management unit controlling storage in said storage medium.

12. The system of claim 3, wherein said network connector is a network interface card.

13. The system of claim 3, wherein the selected data packets comprise RTP or RTCP packets.

* * * * *